Nov. 25, 1941.  C. WEBB ET AL  2,263,748
MANURE SPREADER
Filed May 28, 1940  3 Sheets-Sheet 1
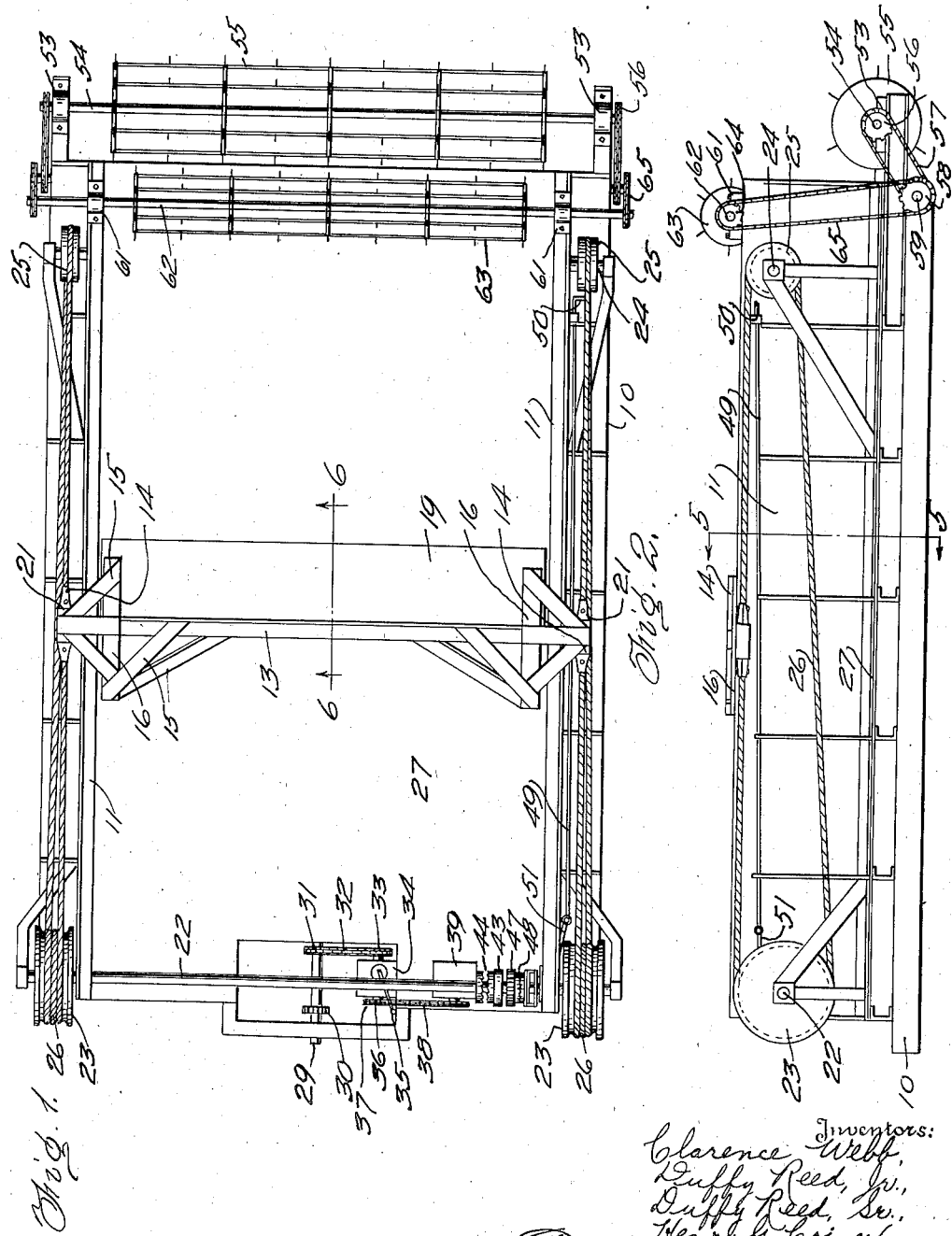

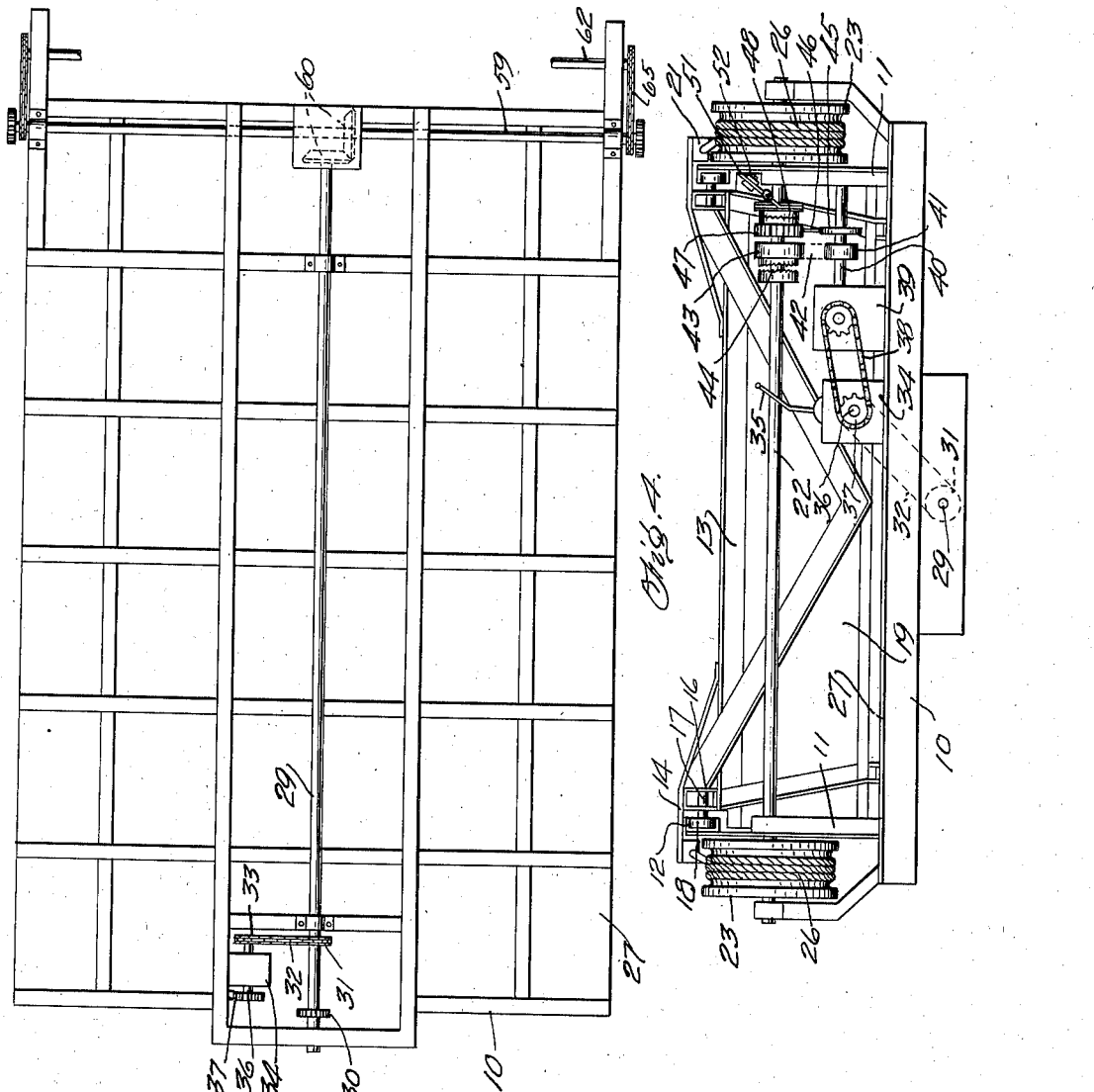

Nov. 25, 1941.   C. WEBB ET AL   2,263,748
MANURE SPREADER
Filed May 28, 1940   3 Sheets-Sheet 3
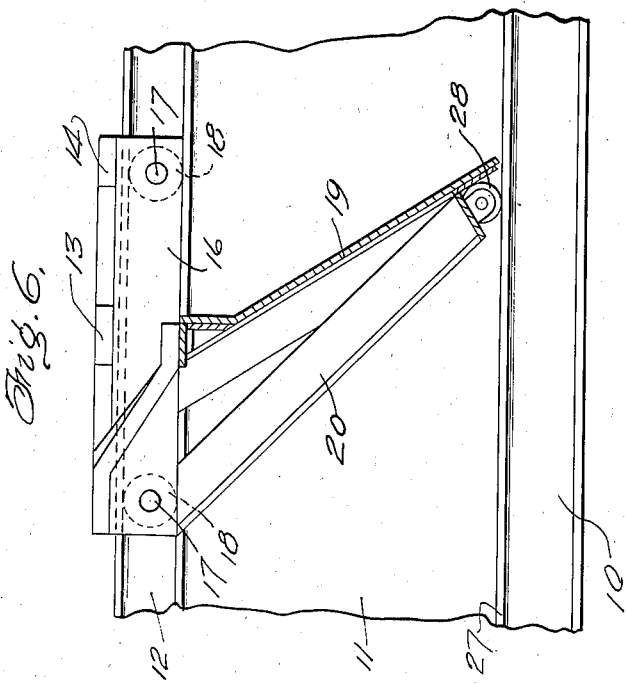
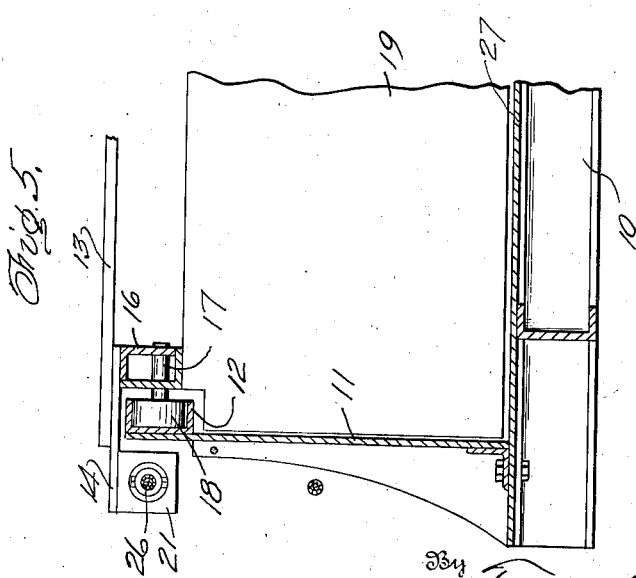

Patented Nov. 25, 1941

2,263,748

UNITED STATES PATENT OFFICE 2,263,748

MANURE SPREADER

Clarence Webb, Duffy Reed, Jr., Duffy Reed, Sr., and Henry G. Coiner, Twin Falls, Idaho Application May 28, 1940, Serial No. 337,724

4 Claims. (Cl. 275—3)

This invention relates to an unloading device, and especially to a device of this character designed for spreading manure and the like.

One important object of the invention is to provide a device of this character wherein the load of a wagon body will be gradually transported to the rear thereof and at the rear of the body will be properly distributed.

A second important object of the invention is to provide improved means for distributing the material fed to the rear of a vehicle body.

A third important object of the invention is to provide improved means for slowly moving the load of a vehicle body toward the rear for distribution.

A fourth important object of the invention is to provide novel means for actuating the device for pushing the material to the rear of the vehicle body.

A fifth important object of the invention is to provide means whereby the pushing means above referred to will be moved slowly, as by a step by step movement, toward the rear and which will be returned rapidly for re-loading.

A sixth important object of the invention is to provide novel means whereby the movement of the device for pushing the material rearwardly is automatically reversed at each end of its movement.

With the above and other objects in view, the invention consists in general of certain novel details of construction and combination of parts hereinafter fully described, illustrated in the accompanying drawings and particularly pointed out in the appended claims.

In the accompanying drawings, like characters of reference indicate like parts in the several views, and—

Figure 1 illustrates a plan view of the device;

Figure 2 illustrates a side elevation thereof;

Figure 3 illustrates a bottom plan view of the device removed from the vehicle;

Figure 4 illustrates a front end view of the device to an enlarged scale;

Figure 5 illustrates an enlarged detail section on the line 5—5 of Fig. 2; and

Figure 6 illustrates a detail section on the line 6—6 of Fig. 1 to a greatly enlarged scale.

In carrying out the objects of this invention there is provided a bottom frame 10 which may consist of any desired assembly of longitudinal and cross beams of any preferred shape. Extending up from this bottom frame are side walls, indicated in general at 11. At the upper edge of each of the side members 11 there is provided an inwardly facing channel 12 forming a longitudinal trackway. Extending across the top of the device is a transverse beam 13 carrying at its ends longitudinal members 14 secured to the transverse beam by diagonal braces 15. The members 13, 14 and 15 form a carriage having longitudinal brace members 16, wherein are mounted shafts 17 carrying on their outer ends rollers 18 which run in the trackways 12. From the rear of the carriage formed by the members 13, 14, 15 and 16 there extends downwardly and forwardly a pushing blade 19, suitably supported as by a frame 20. The carriage formed by the members 13, 14, 15 and 16 also provide on their outer sides, grip members 21, for purposes presently to be described. At the forward end of the body thus formed, there is provided a shaft 22 whereon are fixed drums 23, while there is provided at the rear end of the body a shaft 24, whereon is mounted a pair of drums 25, the drums 23 being arranged on opposite sides of the body exterior thereof, as are also the drums 25. Around these drums are wound ropes or cables 26 each of which is connected respectively at 21 to an end of the carriage. The floor of the body is shown at 27 and at the bottom of the blade 19 there are provided rollers 28 which roll on the floor 27. The shaft 22 is the driving shaft for the device.

Beneath the body frame 10 extends a longitudinal driving shaft 29. This driving shaft is provided with a gear or sprocket 30 by means of which it may be driven from the driving means of the vehicle on which this body is mounted. Also, there is provided on the shaft 29 a gear or sprocket 31 which is connected by a chain 32 with a sprocket on a shaft 33 extending into a change gear mechanism of any common variety, the casing of which is shown at 34 and having an operating handle 35. The delivery shaft for the power derived from the change gear mechanism is indicated at 36 and is provided with a gear or sprocket 37 which is connected by a chain 38 with a reduction gear of ordinary type, the casing of which is indicated at 39, it being deemed unnecessary to show the specific construction of this reduction gear. A shaft 40 extends from this reduction gear and has fixed thereon a belt pulley 41 which is connected by a belt 42 with a belt pulley 43 revolubly mounted on the shaft 22 and adapted to be clutched to said shaft 22 by a clutch mechanism 44. Also, there is fixed on the shaft 40 an eccentric 45 provided with a pawl finger 46 engaging a ratchet 47 revolubly mounted on the shaft 22 and adapted to be positively engaged with said shaft by a clutch mechanism 48. The clutch mechanisms 44 and 48 are so connected that when one of these clutch mechanisms is engaged to drive the shaft 22, the other will be disengaged therefrom. Extending along one side of the vehicle body is a rod 49 having at its rear end a nut 50 which lies in the path of the member 21. This rod is connected by a flexible cable 51 which passes over a guide wheel 52 to the clutch mechanisms so that upon the member 21 engaging the nut 50, the rod 49 is shifted and the clutch mechanisms are so changed that the mechanism 48 disengages and the mechanism 44 engages, whereby the shaft 40 drives the shaft 22 directly through the chain 42, the step by step pawl and ratchet mechanism driving the shaft 22 prior to this disengagement.

Consequently, from this arrangement it will be seen that the shaft 22 acts to drive the carriage and its supported blade 19 toward the rear of the vehicle until the rearmost point of travel of the blade has been reached. At this time, the clutch device will be shifted as above noted and the carriage and blade 19 will be quickly retracted.

At the rear end of the body there is provided on each side of the frame 10, a bearing 53 and in these bearings is journaled a shaft 54, whereon is fixed a toothed beater 55. Also on the shaft 54 is a gear or sprocket 56 which is connected by a chain 57 with a gear or sprocket 58 fixed on a shaft 59 which, as is shown in Fig. 3, is connected by bevel gearing 60 with the shaft 29. Furthermore, on top of the body sides is supported a pair of bearings 61 wherein is journaled a shaft 62 carrying an upper beater 63. On the shaft 62 is also fixed a gear or sprocket 64 connected by a chain 65 with a sprocket 66 fixed on the shaft 59. By this means the operation of the shaft 29 effects continuous driving of the beaters 55 and 63.

In the operation of the device, the blade 19 is caused, by the mechanism above described, to move to the forward part of the body. The body is then lowered with the material to be distributed. The operation of the shaft 29 now effects a slow step by step movement of the blade 19 to the rear of the machine, while at the same time the beaters 55 and 63 are actuated to tear up and distribute the mass of the material which is being shoved rearwardly to the ground. It is to be understood that the frame 10 may be mounted on any desired body and be carried through the field or area on which it is intended to distribute the material by a tractor or other suitable device.

We claim:

1. In an unloading device for manure and the like a vehicle body having a fixed floor and upstanding sides and open at its rear end, a pushing blade extending between said sides and movable over the floor between the front and rear ends of said body, beater devices extending across the body at the rear end thereof, a transmission shaft extending longitudinally of the body from front to rear thereof, driving gearing at the rear end of the shaft operatively connecting said shaft and beaters, actuating means for reciprocating the blade longitudinally of the vehicle body, means operatively connecting said shaft and actuating means, trackways extending longitudinally of said sides at the upper edges thereof, a carriage spanning said body and provided with wheels running in said trackways and supporting said blade, said carriage being connected to said actuating means, said blade extending downwardly and forwardly from said carriage to incline toward the beater devices, said carriage having side frames adjacent each of said upstanding sides and inclined to brace said blade, and rollers on the lower ends of the side frames resting on said floor.

2. In an unloading device for manure and the like, a vehicle body having a fixed floor and upstanding sides and open at its rear end, a pushing blade extending between said sides and movable over the floor between the front and rear ends of said body, beater devices extending across the body at the rear end thereof, a transmission shaft extending longitudinally of the body from front to rear thereof, driving gearing at the rear end of the shaft operatively connecting said shaft and beaters, actuating means for reciprocating the blade longitudinally of the vehicle body, means operatively connecting said shaft and actuating means and operative to produce step-by-step movement of the blade from front to rear of the body and continuous movement of the blade from rear to front, trackways extending longitudinally of said sides at the upper edges thereof, a carriage spanning said body and provided with wheels running in said trackways and supporting said blade, said carriage being connected to said actuating means, said blade extending downwardly and forwardly from said carriage to incline toward the beater devices, said carriage having side frames adjacent each of said upstanding sides and inclined to brace said blade, and rollers on the lower ends of the side frames resting on said floor.

3. In an unloading device for manure and the like, a vehicle body having a fixed floor and upstanding sides and open at its rear end, a pushing blade extending between said sides and movable over the floor between the front and rear ends of said body, beater devices extending across the body at the rear end thereof, a transmission shaft extending longitudinally of the body from front to rear thereof, driving gearing at the rear end of the shaft operatively connecting said shaft and beaters, actuating means for reciprocating the blade longitudinally of the vehicle body, means operatively connecting said shaft and actuating means and operative to produce step-by-step movement of the blade from front to rear of the body and continuous movement of the blade from rear to front, said last means including clutches for connecting and disconnecting the step-by-step and continuous movement means from the blade actuating means, trackways extending longitudinally of said sides at the upper edges thereof, a carriage spanning said body and provided with wheels running in said trackways and supporting said blade, said carriage being connected to said actuating means, said blade extending downwardly and forwardly from said carriage to incline toward the beater devices, said carriage having side frames adjacent each of said upstanding sides and inclined to brace said blade, and rollers on the lower ends of the side frames resting on said floor.

4. In an unloading device for manure and the like, a vehicle body having a fixed floor and upstanding sides and open at its rear end, a pushing blade extending between said sides and movable over the floor between the front and rear ends of said body, beater devices extending across the body at the rear end thereof, a transmission shaft extending longitudinally of the body from front to rear thereof, driving gearing at the rear end of the shaft operatively connecting said shaft and beaters, actuating means for reciprocating the blade longitudinally of the vehicle body, means operatively connecting said shaft and actuating means and operative to produce step-by-step movement of the blade from front to rear of the body and continuous movement of the blade from rear to front, said last means including clutches for connecting and disconnecting the step-by-step and continuous movement means from the blade actuating means, means actuated by the movement of the blade at the extremities of its path and arranged to shift said clutches and thereby effect change in the direction of travel of the blade, trackways extending longitudinally of said sides, a carriage spanning said body and provided with wheels running in said trackways and supporting said blade, said carriage being connected to said actuating means, said blade extending downwardly and forwardly from said carriage to incline toward the beater devices, said carriage having side frames adjacent each of said upstanding sides and inclined to brace said blade, and rollers on the lower ends of the side frames resting on said floor.

CLARENCE WEBB.
DUFFY REED, Jr.
DUFFY REED, Sr.
HENRY G. COINER.